Dec. 24, 1963         R. W. KRITZER         3,114,963
    AUTOMATIC APPARATUS FOR LOADING AN ASSEMBLY NEST WITH
      FIN STRIPS IN THE PRODUCTION OF HEAT EXCHANGE UNITS
Filed April 3, 1961                           3 Sheets-Sheet 1
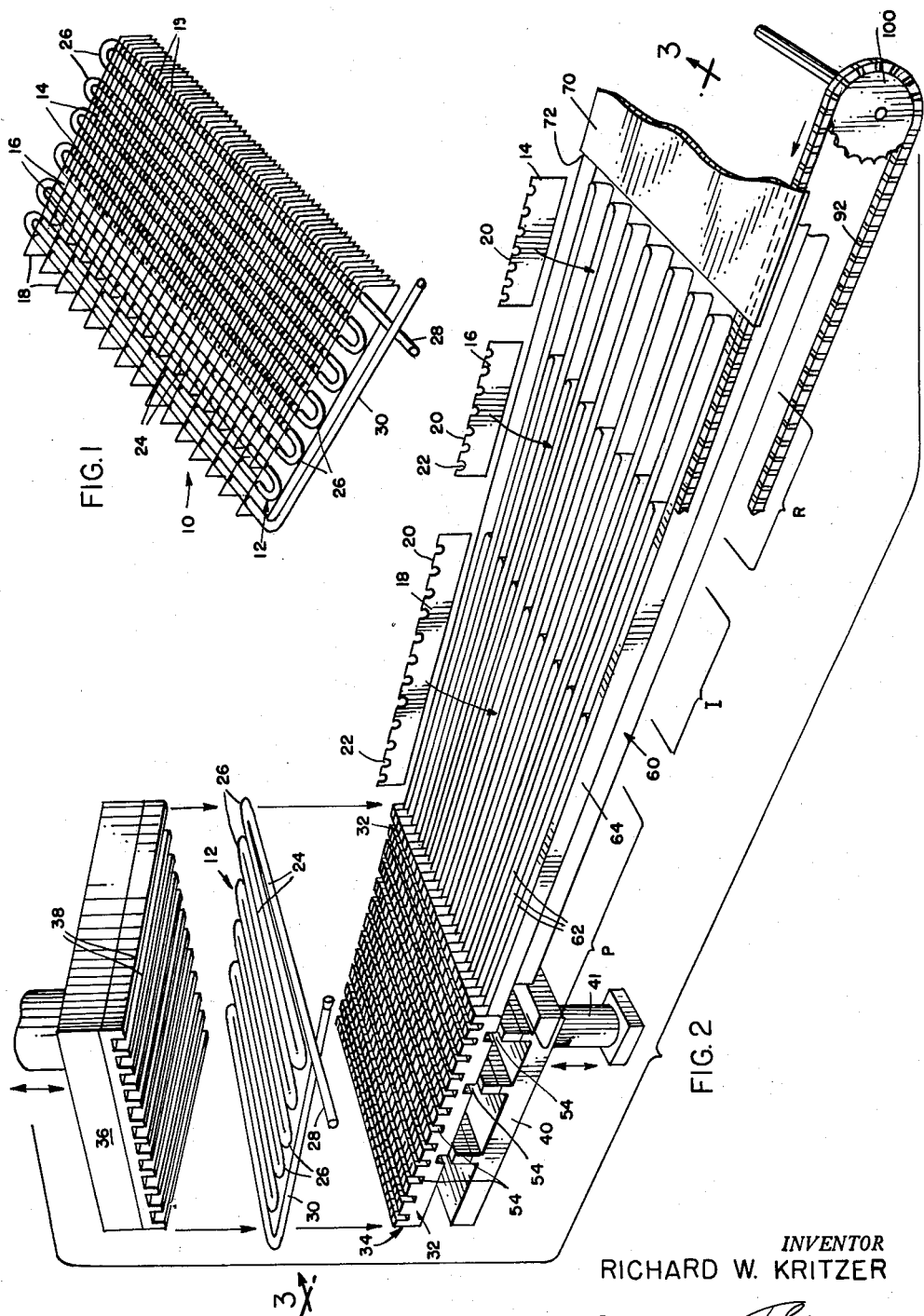
INVENTOR
RICHARD W. KRITZER
BY
ATT'Y

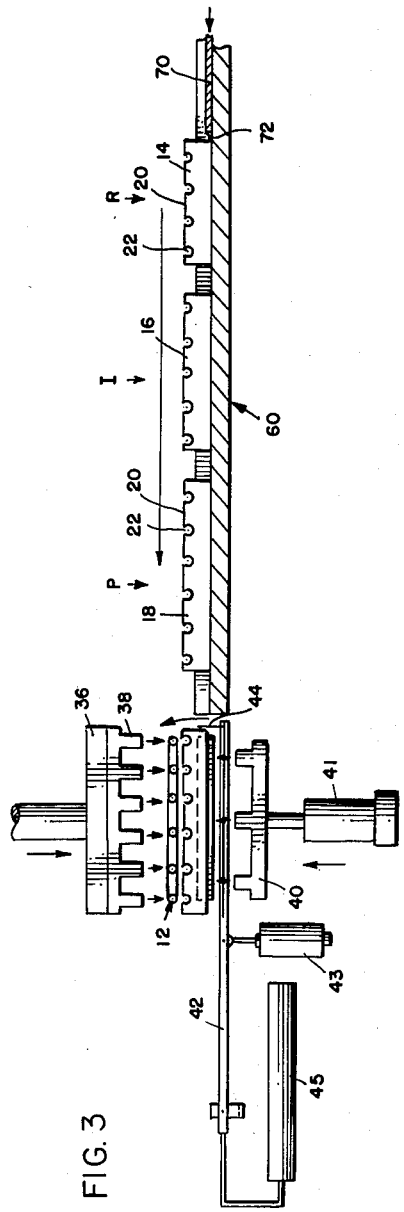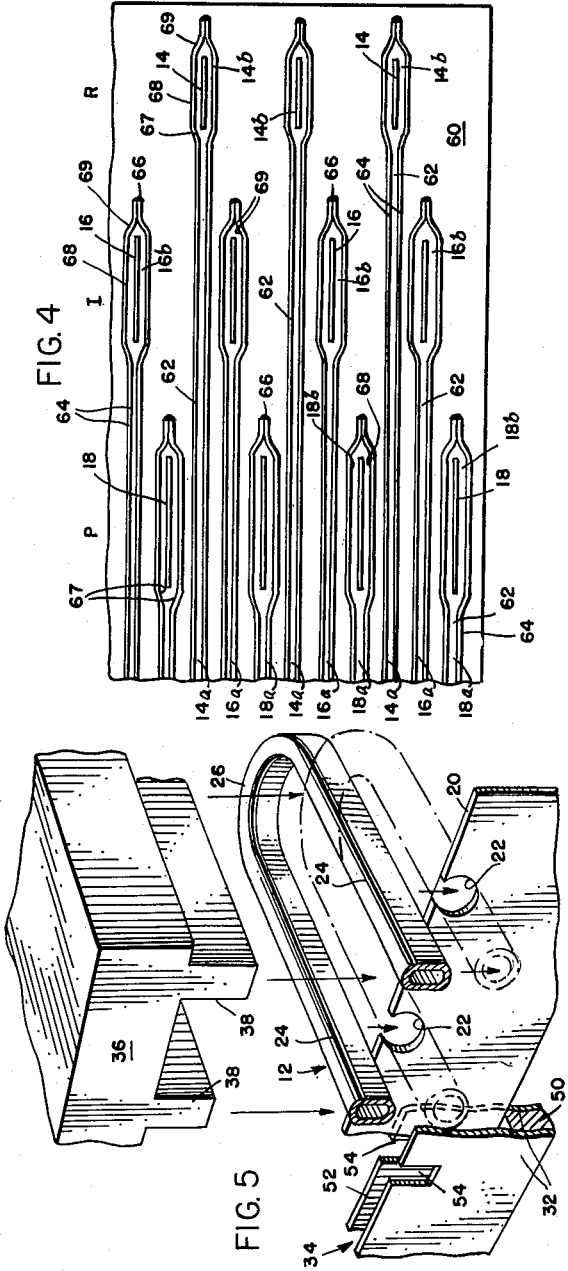

INVENTOR
RICHARD W. KRITZER

United States Patent Office 3,114,963
Patented Dec. 24, 1963

3,114,963
AUTOMATIC APPARATUS FOR LOADING AN ASSEMBLY NEST WITH FIN STRIPS IN THE PRODUCTION OF HEAT EXCHANGE UNITS
Richard W. Kritzer, 1355 N. Astor St., Chicago, Ill.
Filed Apr. 3, 1961, Ser. No. 100,076
11 Claims. (Cl. 29—202)

The present invention relates to the manufacture of heat exchange units and has particular reference to an automatic loading apparatus for feeding strips of fin stock to the assembly nest of an hydraulic press where the strips are held in position while the press platen forces lengths of tube stock into notches in the upper edges of the strips, after which the thus assembled heat exchange unit is ejected from the nest to clear the same for repetitive operations in the successive production of heat exchange units.

Briefly, and as disclosed in co-pending United States continuation patent application Serial No. 241,906, filed on December 3, 1962, and entitled "Heat Exchange Units," a heat exchange unit of the type to which the present invention relates consists of: (1) a length of serpentine tube stock which has spaced apart straight reach sections and curved or arcuate end sections at the ends of the straight reach sections; and (2) closely spaced, elongated parallel strips which are formed of flat fin stock and are secured to, and extend transversely of, the straight reach sections of the tube stock. The method by means of which the strips of flat fin stock are secured to the tube stock is shown and described in United States Patent No. 2,913,806, granted on November 24, 1959, and entitled "Fabrication of Heat Transfer Units." Briefly, such method involves providing in one longitudinal edge of each strip of fin stock spaced arcuate notches which are major circle sectors, and then positioning the strips in an assembly nest of an hydraulic press, so that the notched edges thereof are presented upwardly with the notches of adjacent strips being aligned in transverse rows. Thereafter, a length of serpentine tube stock having the requisite number of reach sections is positioned above the loaded nest with the reach sections in vertical register with the various rows of notches and the press platen is caused to descend upon the nest and force the reach sections of the length of serpentine tubing into the various notches. The reach sections are generally oval in transverse cross section and the minor axis of the ellipse involved is of less extent than the entrance openings of the notches so that the reach sections may readily enter the notches, after which the pressure of the platen in the direction of oval elongation will expand the reach sections to circular form to the end that they will frictionally engage the notches and thus interlock the length of serpentine tubing with the strips of fin stock and produce the completed heat exchange unit.

Specifically, the present invention is concerned with an apparatus for automatically feeding the notched strips of fin stock to the assembly nest of the hydraulic press to thus load the same preparatory to descent of the press platen. Due to the comparatively large number of fin strips involved in the assembly of any given heat exchange unit, the placement of these strips in the assembly nest of the hydraulic press has involved considerable detail work on the part of the operator or operators whose duty it is to feed the nest with the fin strips. Manual feeding of the assembly nest in the immediate vicinity of the press, i.e., placement of the fin strips directly in the nest beneath the raised platen, which is present-day practice, involves many difficulties. In the first place, there is room for only one operator in front of the nest so that each and every fin strip must receive the individual attention of the operator with all of the fin strips being successively introduced into the nest by that operator. Secondly, visibility of and accessibility to the nest is limited due to lack of head room, the raised platen being posed above the nest by a distance of only a few feet so that the operator is precluded from conveniently working above the nest. Thirdly, due to the close spacing of the fin-receiving channels associated with the nest, the chances of error in fin placement are great, particularly where the fin strips being assembled vary in length. Finally, not only is the single operator obliged to consider the matter of transverse placement of the strips in the nest, but also he must consider longitudinal placement of the strips so that the various notches will fall into rows which may receive the straight reach sections of the serpentine tubing to be assembled upon the fin strips.

The present invention is designed to overcome the above-noted limitations that are attendant upon conventional methods of feeding strips of fin stock to the assembly nest of an hydraulic press and, toward this end, in its broadest aspect, it contemplates the provision of a novel automatic loading apparatus having associated therewith a preliminary assembly nest to which the various strips of fin stock may be fed, together with channeling means leading from the preliminary assembly nest to the assembly nest of the press and whereby strips of fin stock placed in the preliminary assembly nest may be guided endwise to the assembly nest of the press and caused to enter the latter nest through one end thereof and assume their proper operative positions of orientation within the nest relative to the press platen.

The provision of an automatic loading apparatus of the character briefly outlined above constitutes the principal object of the present invention and, briefly, in carrying out this object, the invention contemplates the provision of an elongated work table which extends outwardly alongside the hydraulic press directly from one side of the assembly nest and the upper surface of which is provided with a series of elongated narrow parallel guide channels, one for each fin-receiving slot in the assembly nest of the hydraulic press. The various channels extend longitudinally along the upper face of the work table in closely spaced parallelism and each channel communicates with a respective fin-receiving slot in the assembly nest so that a fin strip positioned in the channel may be slid longitudinally therealong toward the nest and caused to enter the slot which communicates with the channel. Since the channels extend to regions which are remote from the hydraulic press, the matter of head room and other congestion at the hydraulic press is obviated and one or more operators, working from either or both sides of the work table, may conveniently load the channels with the requisite number of fin strips so that when the entire preliminary assembly nest afforded by the channels has been filled or loaded, all of the fin strips may be shifted bodily in unison toward the press and slid endwise into the assembly nest of the press so that they will assume their proper positions within this latter nest preparatory to descent of the press platen.

Since there is no limitation upon the length of the work table and channels associated therewith, a plurality of loading stations may be set up along the table, one for each operator. Thus, for example, if the assembly nest of the hydraulic press is sixty fin strips wide, which is to say that it is provided with sixty transversely spaced fin-receiving grooves, and two operators are employed, these operators may work from opposite sides of the work table at longitudinally displaced regions therealong, one operator feeding all of the channels on one side of the longitudinal center line of the table and the other operator feeding all of the channels on the other side of the center line. If the nest is sixty fin strips wide, each operator will feed thirty fin strips into the channels closest to him. If three operators are employed at three longitudinally displaced regions along the table, two of the operators may feed the outermost twenty channels on the opposite side of the table, respectively, while the third operator may feed the twenty medial channels.

The invention further contemplates a still more convenient arrangement of channeling on the upper face of the work table, the arrangement being particularly applicable where different lengths of fin stock are to be fed to the assembly nest and also being applicable even where the fin stock is of uniform length. Assuming for purposes of discussion that the assembly nest of the hydraulic press is sixty fin strips wide and that three loading stations are provided along the work table, only twenty of the channels may be caused to extend from the assembly nest all the way to the most remote of the three loading stations. Twenty additional channels may extend from the assembly nest to the medial loading station and terminate at this region, while the remaining twenty channels will extend from the assembly nest only to the next adjacent or proximate loading station. Since the operator at the remote loading station is confronted with only twenty channels in which he is required to deposit ten strips, the receiving ends of channels at this station may be appreciably widened to provide relatively large entrance openings for the fin strips. These widened channel portions constitute receiving pockets for the fin strips and the pockets may taper down immediately to normal channel width before the fin strips reach the medial loading station. Similarly, at the medial loading station, there is ample room for widening the ends of the channels which terminate at this station to provide receiving pockets which may taper in width to normal channel size before the fin strips reach the proximate loading station. At the proximate loading station, the channels which terminate at such station may likewise be widened to provide receiving pockets which also taper to normal channel width before the strips reach the assembly nest.

Considering the above arrangement of channeling, it will be seen that the operator at the remote loading station has only twenty pockets to feed so that he can make no error in feeding. The operator at the medial loading station will be concerned with forty channels, but, since twenty of these channels are in the form of relatively wide pockets, he will have no difficulty in loading them without error. The other twenty channels which pass through his station are of normal width and are unlikely to be confused with the wide fin-receiving pockets. Similarly, at the proximate loading station, the operator will be confronted with sixty channels, but since forty of these channels are of normal width and twenty of them present relatively wide open pockets for fin-feeding purposes, there will be little likelihood of misapplication of fins to the proper channels.

For symmetry of channel placement, as well as for the convenience of the operators, there may be a sequential association of channels with the individual stations. For example, commencing at one end of the assembly nest, channels 1, 4, 7, 10, etc., may extend to the remote loading station; channels 2, 5, 8, 11, etc., may extend to the medial loading station; and channels 3, 6, 9, 12, etc., may extend to the proximate loading station. Other channel sequence arrangements are, of course, possible within the scope of the present invention.

Still further, according to the present invention, means are provided for mechanically sliding all of the fin strips which have been loaded into the preliminary loading nest along the channels in the same direction toward the hydraulic press and into the assembly nest of the latter. This means assumes the form of a pusher plate which is longitudinally slidable over the upper face of the work table and which engages the adjacent end of each strip of fin stock as it encounters the same to "pick up" such strip and impel the same toward the press and into the assembly nest thereof. In the example given above where three loading stations are employed, this pusher plate will first engage substantially simultaneously all of the strips of fin stock contained in the pockets at the remote loading station and start them on their way toward the assembly nest. As the plate enters the medial loading station, it will pick up all of the strips of fin stock disposed in the pockets at this station and carry them along with the first-encountered strips. Finally, the plate will enter the proximate loading station and engage all of the fin strips disposed in the pockets at this station, at which time the plate will force the three groups of fin strips toward the press and into the assembly nest thereof. After the strips have thus been loaded into the assembly nest, the pusher plate is restored to its remote position preparatory to the next loading operation. The pusher plate is adapted to be power-actuated under the control of the operator of the press who may be guided by observation or by signal from the loading operators.

Numerous other objects and advantages of the invention, not at this time enumerated, will become more readily apparent as the following description ensues. In the accompanying three sheets of drawings forming a part of this specification, one illustrative embodiment of the invention has been shown.

In these drawings:

FIG. 1 is a perspective view of a heat exchange unit constructed and assembled by the apparatus of the present invention;

FIG. 2 is a fragmentary perspective view somewhat schematic in its representation, of one exemplary form of apparatus constructed according to the principles of the present invention;

FIG. 3 is a sectional view schematic in its representation, and taken substantially on the vertical plane indicated by the line 3—3 of FIG. 1 and in the direction indicated by the arrows;

FIG. 4 is an enlarged fragmentary top plan view of a portion of the work table shown in FIG. 1;

FIG. 5 is a fragmentary perspective view showing a portion of the assembly nest associated with the hydraulic press and illustrating schematically its relationship with respect to the pressing platen.

*The Composite Heat Exchange Unit*

Figure 6:
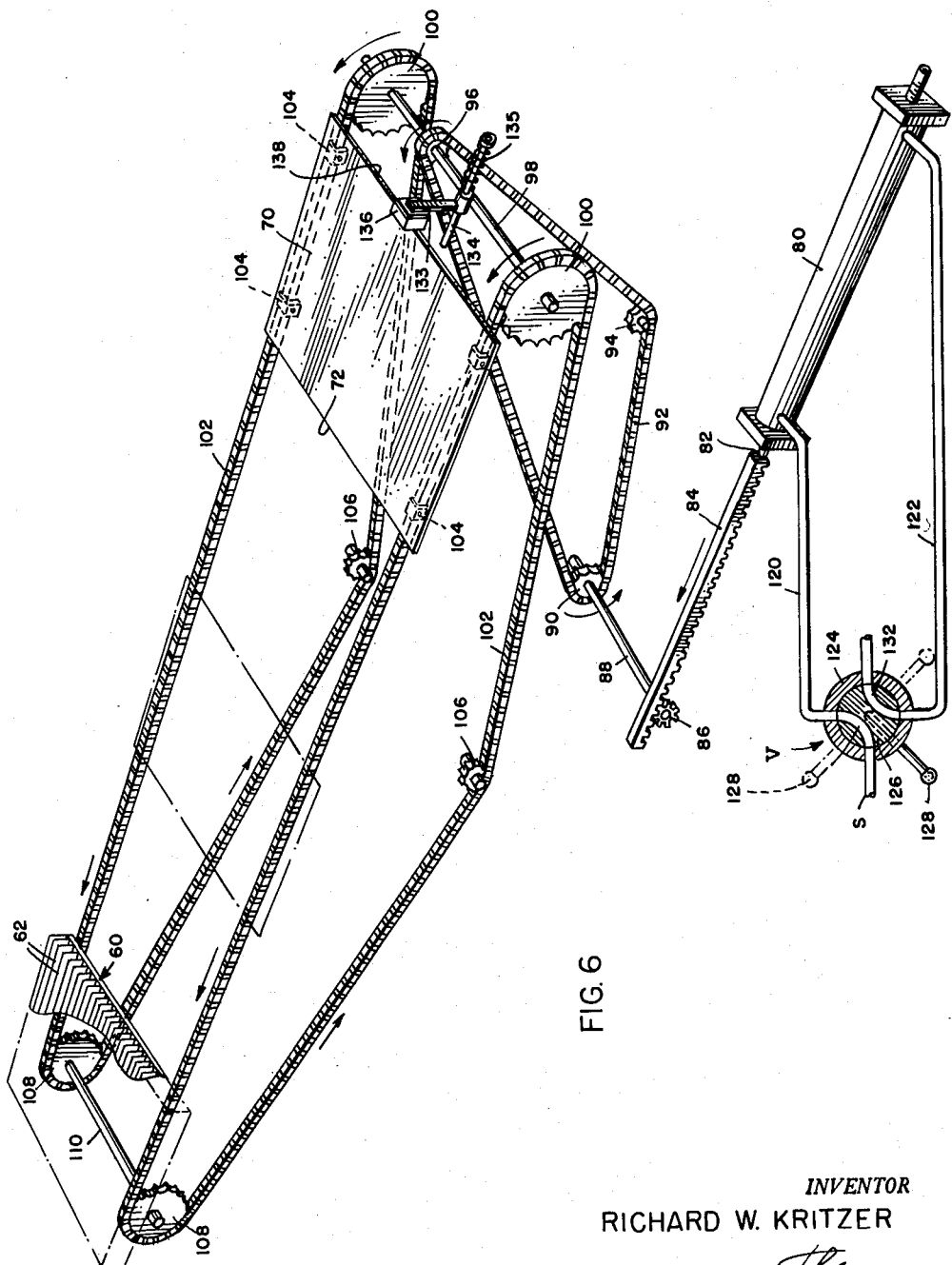
FIG. 6 is a schematic perspective view of certain pusher plate actuating mechanism employed in connection with the apparatus.

Referring now to the drawings in detail, and in particular to FIG. 1, an exemplary form of heat exchange unit capable of being assembled by the apparatus of the present invention has been designated in its entirety at 10. Briefly, the unit consists of a single length of tubing 12 which has been bent to serpentine form and to which there has been applied a series of closely spaced, parallel, elongated, flat, preformed strips 14, 16 and 18 of sheet metal fin stock. Such strips establish a series of cooling fins which extend across and bridge the straight reach sections of the serpentine tube stock. The assembled tube and fin structure constitutes a basic heat exchange assembly which may be operatively installed or mounted in a wide variety of installations by means of suitable supporting framework, such as specially shaped mounting brackets (not shown) which may fit over the reverse bends or arcuate end sections at the ends of the straight reach sections of the serpentine tubing 12. While in many heat exchange units of this general character, the various strips of fin stock are of equal length and extend coextensively across the structure, the illustrated heat exchange unit 10 is of a special type and the fin strips 14 are of relatively short length, the strips 16 are of an intermediate length and the strips 18 are of a relatively long length. All of the strips 14, 16 and 18 terminate in a common plane as indicated at 19 along one side of the unit 10.

The method of forming the various strips 14, 16 and 18 of fin stock and attaching them to the serpentine length of tubing 12 is similar to the method which is shown and described in aforementioned United States Patent No. 2,913,806, and reference may be had to such patent for a detailed description of the method. It is deemed sufficient for purposes of disclosure herein to state that each strip 14, 16 and 18 is severed from a large strip of metal, preferably aluminum, and that each strip, for example, the strip 14 as shown in FIG. 5, is provided with one longitudinal edge 20 which is interrupted at spaced regions therealong by arcuate notches 22. Each notch 22 constitutes a major circle sector which is slightly greater in extent than 180°. The length of the tubing 12 includes, as hereinbefore indicated, a series of straight reach sections 24 and reverse bends 26 at the ends of the straight reach sections. The free ends 28 and 30 of the tubing 12 terminate at the same end of the unit, the end 28 being coaxial with one of the straight reach sections 24 and the end 30 being turned laterally. Obviously, where the serpentine tubing possesses an even number of reach sections, the ends thereof will terminate at the same end region of the unit 10, and where an odd number of such reach sections are provided, the ends 28 and 30 will terminate at opposite end regions of the unit.

*The Assembly Nest*

As described in Patent No. 2,913,806, prior to their association with the strips of fin stock, the straight reach sections 24 of the tubing 12 are oval or elliptical in cross section and the major axes of the ellipses are slightly less in extent than the width of the entrance opening of each notch 22. The various strips of preformed fin stock are confined between adjacent spacer strips 32 (FIGS. 1 and 5) associated with an assembly nest such as the nest which has been designated in its entirety at 34 in FIG. 1, with the fin strips extending in slightly spaced parallel relationship and with the various notches 22 arranged in straight, transversely extending rows. The length 12 of tubing, which previously has been shaped to its serpentine configuration, is then positioned above the nest 34 so that the straight reach sections 24 thereof register vertically with the transverse rows of notches 22 and, thereafter, a pressing platen 36 having elongated pressing feet 38 is caused to descend upon the nest so that the pressing feet 38 engage the straight reach sections 24 and force them into the various notches 22 and against the bottoms of the notches so as to cause the tubing to expand into intimate contact with the edges of the notches 22 and fill the same as shown in dotted lines in FIG. 5. In this manner, the strips of fin stock are frictionally bonded to the reach sections of the tubing 12 in intimate heat exchange relationship to produce the assembly 10 shown in FIG. 1. After the unit has thus been formed, it may be stripped from the assembly nest 34 by suitable stripper mechanism including a vertically movable stripper plate 40 (FIG. 3) operable under the control of a fluid motor 41, an elevating carriage 42, operable under the control of a fluid motor 43, and an ejector slid 44 operable under the control of a fluid motor 45. The stripping and ejecting mechanism forms no part of the present invention and its disclosure herein is purely incidental, it constituting the subject matter of United States Patent No. 3,102,330, granted to me on September 3, 1963, and entitled "Automatic Mechanism for Stripping and Ejecting Fin-Type Heat Exchange Units From an Assembly Press."

Referring now to FIGS. 2 to 5, inclusive, the various spacer strips 32 of the assembly nest 34 are maintained in their slightly spaced relationship by means of a series of filler strips 50, the spacer strips 32 and filler strips serving, in effect, to provide a series of upwardly presenting grooves 52, each groove being adapted to receive therein one of the fin strips 14, 16 or 18, as the case may be. The adjacent ends of the grooves 52 are open, so that instead of manually inserting the strips of fin stock in the groove from above the assembly nest, as is conventional practice, the strips may be slid endwise through the open ends of the grooves and into position within the latter.

Each spacer strip 32 is formed with a series of notches 54 in the upper edge thereof, and, considered collectively, the notches 54 of the series of spacer strips 32 are arranged in transverse alignment to provide a series of rows of notches designed for register with the circular notches 22 in the fin strips 14, 16 and 18 when the latter are in their operative positions within the assembly nest 34. These notches 54 provide clearance regions for the elongated pressing feet 38 of the platen 36 when the platen descends upon the nest to force the reach sections 24 of the tubing 12 into the upwardly presented notches 22 provided in the fin stock, as previously described.

*The Work Table*

Positioned adjacent the assembly nest 34 and extending outwardly horizontally from one side thereof is an elongated work table 60. The upper face of the work table is provided with means defining a series of longitudinally extending channels adapted to receive therein the strips of fin stock which are to be fed to the assembly nest. The specific nature of the various channels will be set forth subsequently, but for the present, it is sufficient to state that there is one channel for each fin strip which is to be associated with a given assembled heat exchange unit 10. In other words, there is one channel for each groove 52 associated with the assembly nest 34. Collectively, the channels have been designated at 62, but individually, these channels have applied thereto reference numerals which are indicative of the character of fin strip adapted to be received therein. Thus, the channels specifically designated at 14a are adapted to receive therein the short fin strips 14 and guide them therealong toward the assembly nest 34; the channels specifically designated at 16a are adapted to receive therein the intermediate length fin strips 16 for conduction to the nest 34; and the channels specifically designated at 18a are adapted to receive therein the long fin strips 18 for conduction to the nest 34.

Various means may be devised for establishing the channels 62. For example, these channels may be in the form of grooves which are cut in the upper face of the work table 60. However, in the interest of economy, the channels 62 may be established by appropriately placing elongated strips of thin sheet steel stock on the table and suitably anchoring them in position so that adjacent strips will define therebetween the desired channels. The use of such strips has been illustrated in FIG. 4 where the strips are indicated at 64.

The channels which are identified by the reference numeral 14a are substantially coextensive with the table 60 and extend from every third groove 52 in the assembly nest 34 to the remote end of the table 60 and terminate at a first or remote loading station R. The channels designated 16a terminate at a second or intermediate loading station I which is closer to the assembly nest 34 than the remote loading station R. The channels labelled 18a terminate at a proximate loading station P still closer to the assembly nest 34. Termination of any of the channels may be effected by bringing the adjacent ends of the strips 64 which define these channels together and welding them as indicated at 66 in FIG. 4.

In order to facilitate loading of the fin strips 14 into the channels 14a, these channels are widened appreciably at the region where they extend into the remote loading station R and the widened portions of the channels define, in effect, a series of open pockets 14b which are in direct communication with the channels 14a. Where strips 64 of the steel stock are used for forming the channels 14a, the pockets 46 may be defined by causing the marginal strips 64 to diverge as at 67 and then extend in parallelism as at 68 to provide the side portions of the pockets and finally to converge as at 69 so that the ends thereof may contact each other for welding purposes. The maximum width of the pocket 14b may be several times the width of the channel 14a, while the length of the pocket 14b is such that it will conveniently accommodate the short strips 14 of fin stock. The diverging portions 67 serve to guide the strips 14 into the channel 14a when the strips are impelled forwardly along the table 60 toward the assembly nest 34.

The ends of the channels 16a at the intermediate loading station I and the ends of the channel 18a at the proximate loading station P are similarly provided with pockets 16b and 18b, respectively. The width of each pocket being appreciably greater than the width of the channel with which it communicates and the length of the pocket being such that it will conveniently accommodate placement therein of the fin strip 16 or 18, as the case may be, which it is designed to receive.

Although only eleven complete pockets, i.e., four each of the pockets 16b and 18b, and three of the pockets 14b, have been illustrated in FIG. 4, if it is assumed that the assembly nest 34 is capable of accommodating thirty fin strips, each loading station may be provided with ten of the loading pockets. Where three loading stations are provided, ten of the channels will extend to the remote station R; twenty channels will extend to the intermediate loading station I; and thirty channels will extend to the proximate loading station P. The ten channels 14a which extend to the remote loading station R will terminate thereat in the pockets 14b. Ten channels 16a will terminate at the intermediate loading station in the pockets 16b, while the other ten channels 14a will pass through the station alongside the pockets 16b. Ten channels 18a will terminate in pockets 18b at the proximate station P, while ten channels 14a and ten channels 16a will pass completely through this station alongside the pockets 18b.

The Pusher Plate

It has been stated previously that after loading operations are complete at the remote loading station R, the intermediate loading station I and the proximate loading station P, with all of the pockets 14b, 16b and 18b having their respective fin strips 14, 16 and 18 disposed therein, means are provided for impelling all of the fin strips along their respective channels in such a manner that they are caused to enter the open-ended grooves 52 in the assembly nest 34 simultaneously where they will move into operative position with the notches 22 therein in transverse alignment with the notches 54 provided in the strips 32 and in vertical alignment with the elongated members 38 of the platen 36. The means for thus impelling the fin strips 14, 16 and 18 comprises a pusher plate 70 which overlies the upper face of the work table 60 in close proximity thereto and which is power-actuated for advancement toward the assembly nest 34 and retraction away from the nest. The pusher plate 70 may slide on the upper edges of the various channel-forming strips 64, and the leading edge 72 of the plate, during the operative stroke of the latter, is adapted to engage the trailing edges of all of the fin strips 14 in the pockets 14b and impel the strips along the channels 14a to the intermediate loading station I where the pusher plate 70 then picks up, so to speak, all of the fin strips 16 contained in the pockets 16b and impels them together with the previously encountered strips 14 to the remote loading station where the edge 72 of the pusher plate 70 then engages all of the fin strips 18 contained in the pockets 18b. From the proximate loading station P, all of the fin strips 14, 16 and 18 are impelled along their respective channels and caused to enter the open ends of the grooves 52 associated with the assembly nest 34. In its foremost position, the plate 70 has its leading edge 72 substantially coincident with the adjacent side of the nest 34 so that the various strips 14, 16 and 18 are pushed into the nest until their trailing edges lie in a common vertical plane and all of the strips are wholly disposed within the confines of the nest. The operative stroke of the pusher plate 70 is continuous and uninterrupted between the fully retracted and fully advanced position of this plate.

The Pusher Plate Actuating Mechanism

Pneumatic means are provided for actuating the pusher plate 70, and as shown in FIG. 6, includes an actuating cylinder 80 having a plunger 82 associated therewith. A rack 84 carried by the plunger 82 cooperates with a pinion 86 mounted on a shaft 88 on which there is also mounted a sprocket 90. A chain 92 passes around the sprocket 90 and also around the idler sprocket 94 and a third sprocket 96. The sprocket 96 is mounted on a transverse shaft 98 carrying a pair of end sprockets 100 adjacent the opposite ends thereof. A pair of drive chains 102 are connected as at 104 to the opposite side edge regions of the pusher plate 70, and these chains 102 pass around the respective end sprockets 100, around idler gears 106, and around additional end sprockets 108 mounted on an idler shaft 110. The upper straight reach sections of the two chains 102 are coextensive with a major portion of the length of the table 60 and these reach sections may overlie and slide upon the two longitudinal edge regions of the table and receive their support therefrom.

The disclosure of FIG. 2 is somewhat schematic in its representation and the supporting framework for the table 60 and for the power-actuated pusher plate driving mechanism described above has not been illustrated in this view. It will be understood, however, that the mechanism of FIG. 6 underlies the table 60 with the drive shaft 98 being rotatably journalled adjacent the remote end of the table and with the idler shaft 110 being rotatably journalled adjacent the proximate end of the table so that the upper straight reach sections of the two chains 102 may overlie the table, as previously described, and during endwise movement of the chains 102 in opposite directions, serve to carry the plate from one end of the table to the other and vice versa during its operative and inoperative strokes, respectively. The pusher plate 70 is shown in FIGS. 2, 3 and 6 as being in its retracted position with the plunger 82 being withdrawn into the cylinder 80 so that the rack 84 is retracted. Upon actuation of the cylinder 80, the plunger 82 and rack 84 will be projected forwardly from the cylinder 80, thus setting into operation the train of driving mechanism previously described and including the chains 92 and 102 to impel the pusher plates 70 forwardly toward the assembly nest 34. Actuation of the cylinder 80 in the opposite direction will serve to return the pusher plate 70 to its fully retracted position.

In order to actuate the cylinder 80, a pair of fluid lines 120 and 122 lead from the opposite ends of the cylinder 80 to a control valve V which, preferably, is operable under the control of the operator of the press, but which may be disposed so as to be accessible to any one of the operators at the various loading stations R, I and P. The valve V employed for actuating the cylinder 80 may be of any suitable type and it may be either treadle-operated or manually-operated. In FIG. 6, the valve V which has been schematically illustrated for exemplary purposes is manually controlled and it includes a cylindrical valve casing 124 in which there is rotatably disposed the valve core or body 126. An operating handle 128 is connected to the valve body 126 for rotating the same. Briefly, when the operating handle 128 is in the full-line position in which it is shown in FIG. 6, air, issuing from a source S, may flow through a passage 130 provided in the valve body 126 to the line 120 and from thence to one end of the cylinder to retract the plunger 82. At the same time, air in the other end of the cylinder will pass through the line 122 and through a passage 132 in the valve body 126 and be exhausted to the atmosphere. When the operating handle 128 is moved to the dotted-line position thereof, the passage 132 will connect the source S to the line 122 to supply air to the cylinder 80 and cause the plunger 82 to be extended. The exhaust from the cylinder 80 will take place through the line 120 and passage 130.

It will be understood that the length of the rack 84 and the diameters of the various sprockets associated with the power train previously described for actuating the pusher plate 70 will be designed according to engineering expediencies to attain the necessary full sweep of the plate 70 in either direction and at the desired rate of travel with the necessary power application to slide the various strips of fin stock along the channels and ultimately push them into the nest 34. Overrunning of the strips in the nest 34 is prevented due to frictional engagement between the sides of the strips and the walls of the various grooves 52 into which they are forced when they enter the nest 34. The forward position of the pusher plate 70 is determined by the adjacent edge or side of the nest 34, while the retracted position of the plate 70 may be determined by means of a shock absorbing limit stop element 133 which is slidable on a short shaft section 134 and which is spring-pressed as at 135. The shock absorbing element 133 is engageable with a rubber or other elastomeric bumper pad 136 mounted on the trailing edge 138 of the fin-impelling pusher plate 70.

Operation of the Apparatus

In the operation of the apparatus, an operator will be positioned at each of the three loading stations R, I and P, to avoid congestion and give freedom of movement to each operator. It may be assumed that the operator at the stations R and P will be positioned on one side of the table, while the operator at the station I will be positioned at the other side of the table. Each operator will be supplied with fin strips, the operator at the station R receiving short strips 14 for placement in the pockets 14*b* (FIG. 4), the operator at the station I receiving intermediate length fin strips 16 for placement in the pockets 16*b*, and the operator at the station P receiving long fin strips 18 for placement in the pockets 18*b*. The three operators will, of course, work simultaneously and place their respective fin strips in the pockets which exist at their respective loading stations. Since the pockets are comparatively wide as compared to the width of the individual channels 62 leading therefrom, there will be little danger of misapplication of a fin strip by an operator. After the operators have filled all of the pockets of the three stations, the operator of the press will manipulate the valve V (FIG. 6) and set the train of driving mechanism for the pusher plate 70 into operation to cause this plate to travel from its retracted position over the upper face of the table toward the assembly nest 34. As previously described, the plate 70 moves in a plane which is disposed immediately above the upper edges of the channel-forming steel strips 64, but below the upper edges of the fin strips 14, 16 and 18 so that as the plate 70 arrives at each of the three stations R, I and P, it will pick up the strips disposed in the pockets at such stations and cause the leading edges of the strips to make camming engagement with the diverging wall portions 67 of the pockets so as to guide them into their respective channels 62. As the plate 70 passes through the proximate loading station P, it will engage the trailing edges of all of the three groups of fin strips and these strips will be carried along the channel 62 and forced into the nest, as previously described, so that the notches 22 in the upper edges thereof register transversely with the notches 54 in the strips 32 and register vertically with the pressing feet 38 of the platen 36. Thereafter, the platen 36 will be caused to descend upon the pre-positioned length of serpentine tube stock 12 to force the straight reach sections 24 thereof into the notches 22 as hereinbefore briefly outlined and as more fully described in said Patent No. 2,913,806. After the fin strips 14, 16 and 18 have been assembled upon the tubing 12, the ejector mechanism 40, 42 may be actuated to strip the nest 34 and eject the assembled unit 10 from the press. The press operator may then manipulate the valve V in a manner to return the pusher plate 70 to its retracted position.

It is to be distinctly understood that the specific disclosure of three loading stations along the table 60 is purely exemplary and that a greater or lesser number of such stations may be employed, if desired. Generally speaking, where a large number of fin strips are concerned, the length of time which it takes to load the requisite number of fin strips into the preliminary assembly nest on the table 60 will be a direct but inverse function of the number of loading stations and, consequently, of the number of operators employed at the table 60, assuming all of the operators to be equally agile and competent. The use of plural loading stations is not limited to cases where different length fin strips are employed, and two or more loading stations may be used even though all of the fin strips are identical in construction. In such an instance, the use of plural stations reduces the number of channels which extend to each of the stations except the proximate station and, thus, in the absence of the additional channels at such stations, there is ample room for making the fin-receiving pockets sufficiently wide as to obviate any possibility of error in placement on the part of an operator. Obviously, economic considerations will dictate the number of loading stations and, consequently, the number of operators who will be employed in the assembly of various types of heat exchange units.

The invention is not to be limited to the exact arrangement of parts shown in the accompanying drawings or described in this specification as various changes in the details of construction may be resorted to without departing from the spirit of the invention. Therefore, only insofar as the invention has been pointed out particularly in the accompanying claims is it to be limited.

Having thus described the invention, what I claim as new and desire to secure by Letters Patent is:

1. In an apparatus for feeding elongated strips of fin stock endwise into the adjacent ends of a series of closely spaced, parallel, upwardly facing grooves associated with the assembly nest of an hydraulic or other press and which have adjacent open ends on one side of the nest, an elongated work table adapted to be positioned adjacent to the assembly nest so as to present a proximate end which is disposed in close proximity to one side of the nest and a remote end which is removed from such side, means intermediate the ends of said table establishing a loading station, the upper surface of said table being provided with a series of upwardly facing, transversely spaced, open pockets at the loading station and each of which is adapted to receive therein one of the strips of fin stock, there being one such pocket for each groove in the assembly nest, the upper surface of the table also being provided with a series of elongated longitudinally extending and transversely spaced guide channels, there being one channel for each pocket, said channels extending between the loading station and the proximate end of the table, having their proximate ends spaced conformably to the transverse spacing of the grooves in the assembly nest, adapted for registry therewith when the work table is operatively positioned relatively to the assembly nest, and having their other ends in communication with their respective pockets, and a pusher member slidable longitudinally over the upper surface of the table for impelling the strips of fin stock disposed in the pockets along the guide channels and into the grooves of the assembly nest.

2. In a machine for assembling elongated flat strips of fin stock upon straight lengths of tube stock by a pressing operation wherein the tube stock lengths are forced into notches provided in the edges of the fin strips, in combination, a press including an assembly nest for receiving the strips and maintaining them in a predetermined position of orientation, and a platen for forcing the tube stock lengths into the notches in the strips, said assembly nest being provided with a series of closely spaced, narrow, parallel, upwardly facing grooves therein having adjacent open ends on one side of the nest for receiving the strips endwise through said open ends, an elongated work table extending outwardly away from said one side of the nest, means intermediate the remote and proximate ends of the work table respectively establishing a pair of longitudinally spaced loading stations, the upper surface of the work table being provided with a series of upwardly facing, transversely spaced, open pockets at each loading station, each pocket being adapted to receive therein one of the fin strips, there being one pocket for each groove in the assembly nest, and a guide channel for each pocket extending between each pocket and the adjacent open end of its respective groove in the assembly nest for guiding a fin strip from the pocket to the groove.

3. In a machine for assembling elongated, flat strips of fin stock upon straight lengths of tube stock by a pressing operation, the combination set forth in claim 2 and wherein each guide channel constitutes, in effect, an outward horizontal extension of the groove in the assembly nest with which it communicates and is of a width substantially equal to the width of the groove, and wherein each pocket is appreciably wider than the width of the groove with which it communicates.

4. In a machine for assembling elongated, flat strips of fin stock upon straight lengths of tube stock by a pressing operation, the combination set forth in claim 2 and wherein each guide channel constitutes, in effect, an outward horizontal extension of the groove in the assembly nest with which it communicates and is of a width substantially equal to the width of the groove, wherein each pocket is appreciably wider than the width of the groove with which it communicates, and wherein the pockets at the two loading stations are staggered relatively to the transverse direction of the work table.

5. In a machine for assembling elongated, flat strips of fin stock upon straight lengths of tube stock by a pressing operation, the combination set forth in claim 2 and wherein each guide channel constitutes, in effect, an outward horizontal extension of the groove in the assembly nest with which it communicates and is of a width substantially equal to the width of the groove, wherein each pocket is appreciably wider than the width of the groove with which it communicates, wherein the pockets at the two loading stations are staggered relatively to the transverse direction of the work table, and wherein each pocket at one of the two loading stations overlaps a pocket at the other station in a direction transversely of the work table.

6. In a machine for assembling elongated, flat strips of fin stock upon straight lengths of tube stock by a pressing operation, the combination set forth in claim 2 and wherein the depth of each pocket and of each guide channel is less than the width of the individual fin strips whereby the upper regions of the fin strips disposed in the pockets and moving in the guide channels project upwardly above the pockets and channels, and a pusher member overlying said work table and movable toward and away from the assembly nest in a plane below the extreme projecting upper regions of the fin strips and above the pockets and guide channels.

7. In a machine for assembling elongated, flat strips of fin stock upon straight lengths of tube stock by a pressing operation, the combination set forth in claim 2 and wherein each pocket is provided with converging side wall portions affording a tapered entrance opening leading to the communicating guide channel.

8. In a machine for assembling elongated, flat strips of fin stock upon straight lengths of tube stock by a pressing operation, the combination set forth in claim 2 and wherein the channels which extend from the pockets at one loading station are arranged in alternate relationship transversely of the work table with respect to the channels which extend from the pockets at the other loading station.

9. In a machine for assembling elongated, flat strips of fin stock upon straight lengths of tube stock by a pressing operation wherein the tube stock lengths are forced into notches provided in the edges of the fin strips, in combination, a press including an assembly nest for receiving the strips and maintaining them in a predetermined position of orientation, and a platen for forcing the tube stock lengths into the notches in the strips, said assembly nest being provided with a series of closely spaced, narrow, parallel, upwardly facing grooves therein having adjacent open ends on one side of the nest for receiving the strips endwise through said open ends, an elongated work table extending outwardly away from said one side of the nest, means intermediate the remote and proximate ends of the work table establishing three longitudinally spaced loading stations including a proximate loading station, a remote loading station, and an intermediate loading station, the upper surface of the work table being provided with a series of upwardly facing, transversely spaced, open pockets at each of said loading stations, each pocket being adapted to receive therein one of the fin strips, there being one pocket for each groove in the assembly nest, a guide channel for each pocket extending between such pocket and the adjacent open end of its respective groove in the assembly nest for guiding a fin strip from the pocket to the groove, the pockets at the intermediate loading station and at the remote loading station being staggered relatively to the transverse direction of the work table, the pockets at the intermediate loading station and at the proximate loading station being similarly staggered, and the pockets at the remote loading station and at the proximate loading station also being similarly staggered.

10. In a machine for assembling elongated, flat strips of fin stock upon straight lengths of tube stock by a pressing operation, the combination set forth in claim 9 and wherein each guide channel constitutes, in effect, an outward horizontal extension of the groove in the assembly nest with which it communicates and is of a width substantially equal to the width of the groove, wherein each pocket is appreciably wider than the width of the groove with which it communicates, and wherein each pocket of each series of pockets overlaps one or more pockets of an adjacent series of pockets.

11. In a machine for assembling elongated, flat strips of fin stock upon straight lengths of tube stock by a pressing operation, the combination set forth in claim 10 and wherein the depth of each pocket and of each guide channel is less than the width of the individual fin strips whereby the upper regions of the fin strips disposed in the pockets and moving in the guide channels project upwardly above the pockets and channels, and a pusher member overlying the work table and movable toward and away from the assembly nest in a plane below the extreme projecting upper regions of the fin strips and above the pockets and guide channels.

References Cited in the file of this patent

UNITED STATES PATENTS

| | | |
|---|---|---|
| 1,024,124 | Dietz | Apr. 23, 1912 |
| 1,339,434 | Coffelder | May 11, 1920 |
| 1,481,169 | Witte | Jan. 15, 1924 |
| 2,532,303 | Hayward | Dec. 5, 1950 |
| 2,615,237 | Przyborowski | Oct. 28, 1952 |